(12) United States Patent
Ito et al.

(10) Patent No.: US 9,352,792 B2
(45) Date of Patent: May 31, 2016

(54) VEHICLE LOWER STRUCTURE

(71) Applicants: Keita Ito, Nisshin (JP); Shinya Watanabe, Seto (JP); Hirokatsu Fukunaga, Miyoshi (JP); Akihiko Ishikawa, Miyoshi (JP)

(72) Inventors: Keita Ito, Nisshin (JP); Shinya Watanabe, Seto (JP); Hirokatsu Fukunaga, Miyoshi (JP); Akihiko Ishikawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/426,559

(22) PCT Filed: Dec. 10, 2013

(86) PCT No.: PCT/IB2013/002719
§ 371 (c)(1),
(2) Date: Mar. 6, 2015

(87) PCT Pub. No.: WO2014/091289
PCT Pub. Date: Jun. 19, 2014

(65) Prior Publication Data
US 2015/0274224 A1    Oct. 1, 2015

(30) Foreign Application Priority Data

Dec. 11, 2012  (JP) .................................. 2012-270575

(51) Int. Cl.
*B62D 25/18*  (2006.01)
*B62D 35/02*  (2006.01)

(52) U.S. Cl.
CPC ................ *B62D 35/02* (2013.01); *B62D 25/18* (2013.01)

(58) Field of Classification Search
CPC .......... B62D 35/02; B62D 25/18; B62D 35/00
USPC ............................................ 296/180.1, 180.2
See application file for complete search history.

(56) References Cited

U.S. PATENT DOCUMENTS

| | | | | |
|---|---|---|---|---|
| 6,033,010 A | * | 3/2000 | Preiss ................... | B62D 35/005 296/180.1 |
| 6,286,867 B1 | | 9/2001 | Braemig et al. | |
| 7,717,494 B2 | * | 5/2010 | Nagahama ............. | B62D 37/02 296/180.1 |
| 7,988,220 B2 | * | 8/2011 | Oda ....................... | B62D 35/02 280/757 |
| 8,297,685 B2 | * | 10/2012 | Wolf ...................... | B62D 35/02 296/180.1 |

FOREIGN PATENT DOCUMENTS

| | | |
|---|---|---|
| DE | 4118385 A1 | 12/1992 |
| DE | 102009036447 A1 | 4/2010 |
| JP | 4613630 B2 | 1/2011 |
| JP | 4692153 B2 | 6/2011 |

\* cited by examiner

*Primary Examiner* — Pinel Romain
(74) *Attorney, Agent, or Firm* — Oliff PLC

(57) ABSTRACT

A vehicle lower structure includes a plurality of spat body portions and a guide portion. The spat body portions are provided side by side in a vehicle longitudinal direction on a vehicle front side of a wheel, are protruded from an underfloor of the vehicle toward a vehicle lower side, and extend in a vehicle width direction. The guide portion constitutes vehicle-width-direction outer regions of the spat body portions in at least one of second and subsequent rows from a vehicle rear side, is inclined toward the vehicle rear side and outward in the vehicle width direction to guide a traveling wind, and has a vehicle-width-direction outer end that is arranged more outward in the vehicle width direction than a vehicle-width-direction outer end of the spat body portion that is adjacent to the vehicle rear side.

5 Claims, 14 Drawing Sheets

VEHICLE LOWER STRUCTURE

BACKGROUND OF THE INVENTION

1. Field of the Invention

The invention relates to a vehicle lower structure that is equipped with a plurality of spat body portions.

2. Description of Related Art

In a wind pressure resistance reducing device for a wheel described in U.S. Pat. No. 4,692,153, a deflector is provided in front of the wheel with respect to a vehicle. This deflector is constituted of a front deflector (a spat body portion) and a rear deflector (a spat body portion). That is, this deflector is configured as a two-staged deflector. In addition, a traveling wind hits the front deflector and the rear deflector, whereby the wind pressure of the traveling wind applied to the wheel is reduced.

However, in the aforementioned deflector, if the traveling wind hits a vehicle-width-direction outer end of the front deflector, the traveling wind is blown out outward in the vehicle width direction. The traveling wind and a traveling wind that flows backward with respect to the vehicle beside the vehicle may collide with each other. In this case, air turbulence occurs beside the vehicle, and the air resistance of the vehicle becomes high.

Besides, a traveling wind that has hit a front face of the rear deflector may flow backward of the rear deflector with respect to the vehicle in such a manner as to engulf a vehicle-width-direction outer end of the rear deflector, and may hit the wheel. In this case as well, the air resistance of the vehicle becomes high.

SUMMARY OF THE INVENTION

The invention provides a vehicle lower structure that enables the enhancement of aerodynamic performance in the case where a plurality of spat body portions are provided.

A first aspect of the invention relates to a vehicle lower structure. The vehicle lower structure is equipped with a plurality of spat body portions and a guide portion. The spat body portions are provided side by side in a vehicle longitudinal direction on a vehicle front side of a wheel, are protruded from an underfloor of the vehicle toward a vehicle lower side, and extend in a vehicle width direction. The guide portion constitutes vehicle-width-direction outer regions of the spat body portions in at least one of second and subsequent rows from a vehicle rear side, is inclined toward the vehicle rear side and outward in the vehicle width direction to guide a traveling wind, and has a vehicle-width-direction outer end that is arranged more outward in the vehicle width direction than a vehicle-width-direction outer end of the spat body portion that is adjacent to the vehicle rear side.

In the foregoing aspect of the invention, the plurality of the spat body portions are provided on the vehicle front side of the wheel. The spat body portions are arranged side by side in the vehicle longitudinal direction. These spat body portions are protruded from the underfloor of the vehicle toward the vehicle lower side, and extend in the vehicle width direction.

It should be noted herein that the vehicle-width-direction outer regions of the spat body portions in the second and subsequent rows from the vehicle rear side serve as the guide portion, and the guide portion is inclined backward with respect to the vehicle and outward in the vehicle width direction. Thus, a traveling wind that has hit the spat body portion arranged on a vehicle front side (hereinafter referred to as the front spat body portion) as one of a pair of the spat body portions that are adjacent to each other in the vehicle longitudinal direction is guided (flow-straightened) by the guide portion, and flows backward with respect to the vehicle along the guide portion. Then, this traveling wind is blown out to the vehicle rear side from the vehicle-width-direction outer end of the guide portion. Thus, the traveling wind that has been blown out from the vehicle-width-direction outer end of the guide portion and a traveling wind that flows to the vehicle rear side beside the vehicle are restrained from hitting each other. Thus, the occurrence of air turbulence beside the vehicle can be suppressed.

Besides, the vehicle-width-direction outer end of the guide portion is arranged more outward in the vehicle width direction than the vehicle-width-direction outer end of the spat body portion that is adjacent to the vehicle rear side. That is, in the pair of the spat body portions that are adjacent to each other in the vehicle longitudinal direction, the vehicle-width-direction outer end of the guide portion is arranged further apart toward the outside in the vehicle width direction than the vehicle-width-direction outer end of the spat body portion that is arranged on the vehicle rear side (hereinafter referred to as the rear spat body portion). Thus, if a traveling wind that has hit the rear spat body portion flows outward in the vehicle width direction along the rear spat body portion, this traveling wind hits a rear face of the guide portion, and is guided (flow-straightened) by the rear face of the guide portion. Then, this traveling wind flows to the vehicle rear side along the guide portion, and is blown out from between the front spat body portion and the rear spat body portion. Besides, in this case, the traveling wind that is blown out from between the front spat body portion and the rear spat body portion is pulled in by a traveling wind that is blown out to the vehicle rear side from a front face of the guide portion, and is blown out to the vehicle rear side together with the traveling wind that is blown out from the front face of the guide portion. Thus, the traveling wind that has hit the rear spat body portion is restrained from flowing to the vehicle rear side of the rear spat body portion in such a manner as to engulf the vehicle-width-direction outer end of the rear spat body portion. As a result, the traveling wind and the wheel can be restrained from hitting each other. Owing to the foregoing, the aerodynamic performance in the case where the plurality of the spat body portions are provided can be enhanced.

In the foregoing aspect of the invention, at least one of opposed faces of a pair of the spat body portions that are adjacent to each other in the vehicle longitudinal direction is inclined in such a direction as to move away from the opposed spat body portion with decrease in distance to a vehicle lower side.

In the foregoing aspect of the invention, at least one of the opposed faces of the pair of the spat body portions that are adjacent to each other in the vehicle longitudinal direction is inclined in such a direction as to move away from the opposed spat body portion with decrease in distance to the vehicle lower side (i.e., to the vehicle front side as to the front spat body portion, and to the vehicle rear side as to the rear spat body portion). Thus, the accretion of ice, snow or the like between the pair of the spat body portions can be suppressed.

That is, if water, snow or the like is splashed up between the front spat body portion and the rear spat body portion during traveling of the vehicle, ice, snow or the like is accreted between the front spat body portion and the rear spat body portion due to this water, snow or the like. Then, in response to a force that causes the ice, snow or the like accreted between the front spat body portion and the rear spat body portion to fall, a frictional force is generated between the front spat body portion and the rear spat body portion on the one hand and the accreted ice, snow or the like on the other hand.

It should be noted herein that if the rear face of the front spat body portion and the front face of the rear spat body portion are arranged parallel to each other in a vertical direction with respect to the vehicle in a lateral view, the accreted ice, snow or the like is unlikely to fall from between the front spat body portion and the rear spat body portion, due to the aforementioned frictional force.

As a measure against this phenomenon, in the foregoing aspect of the invention, at least one of the opposed faces of the pair of the spat body portions is inclined in such a direction as to move away from the opposed spat body portion with decrease in distance to the vehicle lower side. Thus, the frictional force between the front spat body portion and the rear spat body portion on the one hand and the accreted ice, snow or the like on the other hand becomes small. Thus, the accreted ice, snow or the like is likely to fall from between the front spat body portion and the rear spat body portion. Accordingly, the accretion of ice, snow or the like between the pair of the spat body portions can be suppressed.

In the foregoing aspect of the invention, a spacing distance between vehicle-width-direction outer ends of a pair (or the pair) of the spat body portions that are adjacent to each other in the vehicle longitudinal direction is set shorter than a spacing distance between the pair of the spat body portions in the vehicle longitudinal direction.

In the foregoing aspect of the invention, the gap between the front spat body portion and the rear spat body portion is set narrowest on the outside in the vehicle width direction. Thus, according to the Bernoulli's theory, the velocity of a traveling wind that is blown out to the vehicle rear side from between the vehicle-width-direction outer end of the rear spat body portion and the vehicle-width-direction outer end of the front spat body portion increases. Thus, the traveling wind that has hit the rear spat body portion is further restrained from flowing to the vehicle rear side of the rear spat body portion in such a manner as to engulf the vehicle-width-direction outer end of the rear spat body portion. Accordingly, the traveling wind and the wheel can be effectively restrained from hitting each other.

In the foregoing aspect of the invention, the vehicle-width-direction outer end of the guide portion is arranged closer to the vehicle rear side than the vehicle-width-direction outer end of the spat body portion that is adjacent to the vehicle rear side.

In the foregoing aspect of the invention, the vehicle-width-direction outer end of the guide portion is arranged closer to the vehicle rear side than the vehicle-width-direction outer end of the spat body portion that is adjacent to the vehicle rear side. Therefore, the length of the guide portion can be set long. That is, the region that guides (flow-straightens) the traveling wind that has hit the front spat body portion and the rear spat body portion can be set long. Accordingly, the flow-straightening effect of the guide portion for the traveling end can be enhanced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
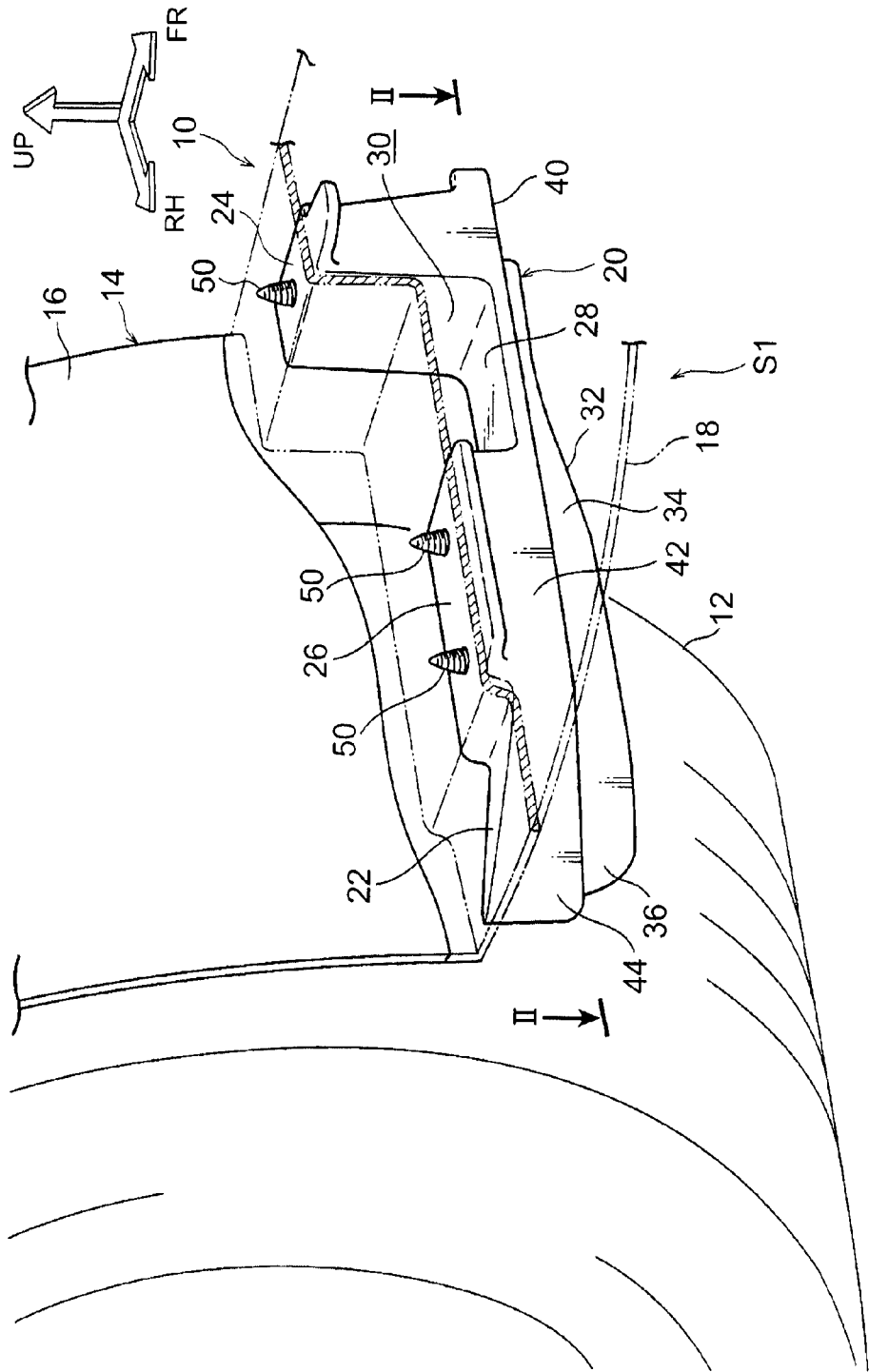
FIG. 1 is a partially cutaway perspective view showing a vehicle right region of a vehicle front portion to which a vehicle lower structure according to the first embodiment of the invention is applied, as viewed from an area diagonally to the right of and in front of a vehicle.

A vehicle lower structure S1 according to the first embodiment of the invention will be described using FIGS. 1 to 13B. Incidentally, in the drawings, a forward direction with respect to a vehicle is indicated by an arrow FR, a rightward direction with respect to the vehicle is indicated by an arrow RH, and an upward direction with respect to the vehicle is indicated by an arrow UP. Besides, a front portion of a vehicle 10 to which the vehicle lower structure S1 is applied is configured laterally symmetrically in a vehicle width direction. Thus, a vehicle right region of the front portion of the vehicle 10 will be described, and the description of a vehicle left region of the front portion of the vehicle 10 will be omitted.

The vehicle 10 is equipped with a front tire 12 as a wheel. Besides, a fender liner 14 is provided radially outward of the front tire 12. This fender liner 14 is equipped with a generally semi-cylindrical arch portion 16 that is opened toward a vehicle lower side. The front tire 12 is covered with the arch portion 16 from a vehicle upper side. Furthermore, a vehicle front region of the fender liner 14 is flexed toward a vehicle front side, and constitutes an underfloor 18 of the vehicle 10.

Besides, a multiple spat 20 is arranged on the vehicle front side of the front tire 12. The multiple spat 20 is fixed to the underfloor 18 of the vehicle 10. In addition, the multiple spat 20 is configured to include an upper wall portion 22, a rear spat body portion 32 as a spat body portion, and a front spat body portion 40 as a spat body portion. The configuration of this multiple spat 20 will be described hereinafter.

The upper wall portion 22 constitutes an upper portion of the multiple spat 20, and is formed concavo-convexly as viewed from the vehicle front side. This upper wall portion 22 has a pair of mounting wall portions 24 and 26. The pair of the mounting wall portions 24 and 26 are arranged side by side in the vehicle width direction. Besides, the mounting wall portion 24 that is arranged on a vehicle left side is arranged closer to a vehicle upper side than the mounting wall portion 26 that is arranged on a vehicle right side. In addition, a generally U-shaped coupling wall portion 28 that is opened toward the vehicle upper side as viewed from the vehicle front side is integrally provided between the pair of the mounting wall portions 24 and 26. The pair of the mounting wall portions 24 and 26 are coupled to each other by the coupling wall portion 28. In addition, upper faces of the mounting wall portions 24 and 26 are slightly inclined toward the vehicle lower side with decrease in distance to the vehicle front side in a lateral view, and abut on a lower face of the underfloor 18. The mounting wall portions 24 and 26 are securely fastened to the underfloor 18 by fastening members such as bolts, rivets or the like. As shown in FIG. 1, in this embodiment of the invention, the pair of the mounting wall portions 24 and 26 are securely fastened to the underfloor 18 by bolts 50.

Besides, an insertion hole 30 (see FIG. 1) is formed between the underfloor 18 and the coupling wall portion 28, and is configured such that a traveling wind passes through the interior of the insertion hole 30 to hit a brake (not shown) that brakes the front tire 12. Furthermore, a vehicle-width-direction outer region of the upper wall portion 22 with respect to the mounting wall portion 26 is formed in a stepped manner as a step that is sunken toward the vehicle lower side.

The rear spat body portion 32 is formed generally in the shape of a plate, and is protruded from a rear end of the upper wall portion 22 toward the vehicle lower side, with the board thickness direction thereof substantially coincident with a vehicle longitudinal direction. This rear spat body portion 32 is configured to include a general portion 34, and an inclined portion 36 that constitutes the vehicle-width-direction outer region of the rear spat body portion 32. The inclined portion 36 is arranged inclined toward a vehicle rear side and outward in the vehicle width direction from a vehicle-width-direction outer end of the general portion 34. Besides, a vehicle-width-direction inner region of a lower end of the general portion 34 is arranged closer to the vehicle upper side than a vehicle-width-direction outer region of the lower end of the general portion 34. The vehicle-width-direction inner region and the vehicle-width-direction outer region are smoothly connected to each other.

The front spat body portion 40 is formed generally in the shape of a plate, and is protruded from a front end of the upper wall portion 22 toward the vehicle lower side, with the board thickness direction thereof substantially coincident with the vehicle longitudinal direction. That is, the front spat body portion 40 is arranged on the vehicle front side of the rear spat body portion 32. The rear spat body portion 32 and the front spat body portion 40 are arranged side by side in the vehicle longitudinal direction. Besides, as viewed from the vehicle front side, the lower end of the rear spat body portion 32 is protruded more toward the vehicle lower side than the lower end of the front spat body portion 40.

This front spat body portion 40 is configured to include a general portion 42, and a guide portion 44 that constitutes a vehicle-width-direction outer region of the front spat body portion 40. The general portion 42 is arranged parallel to the general portion 34 of the rear spat body portion 32. A spacing distance between the general portion 42 and the general portion 34 in the vehicle longitudinal direction is denoted by L (see FIG. 3).

The guide portion 44 is inclined outward in the vehicle width direction and toward the vehicle rear side from the vehicle-width-direction outer end of the general portion 42. A vehicle-width-direction outer end of the guide portion 44 is arranged more outward in the vehicle width direction than the vehicle-width-direction outer end of the rear spat body portion 32 (the inclined portion 36). Besides, the position of the vehicle-width-direction outer end of the guide portion 44 in the vehicle longitudinal direction is set as a position that substantially coincides with the position of the vehicle-width-direction outer end of the rear spat body portion 32 in the vehicle longitudinal direction. In addition, a space between the vehicle-width-direction outer end of the guide portion 44 and the vehicle-width-direction outer end of the inclined portion 36 serves as a discharge portion 46. A width dimension W of the discharge portion 46 (a spacing distance between the vehicle-width-direction outer end of the front spat body portion 40 and the vehicle-width-direction outer end of the rear spat body portion 32) is set shorter than the spacing distance L (see FIG. 3).

Next, the operation and effect in the first embodiment of the invention will be described, while making a comparison with a vehicle 10' according to a comparative example.

Figure 12:
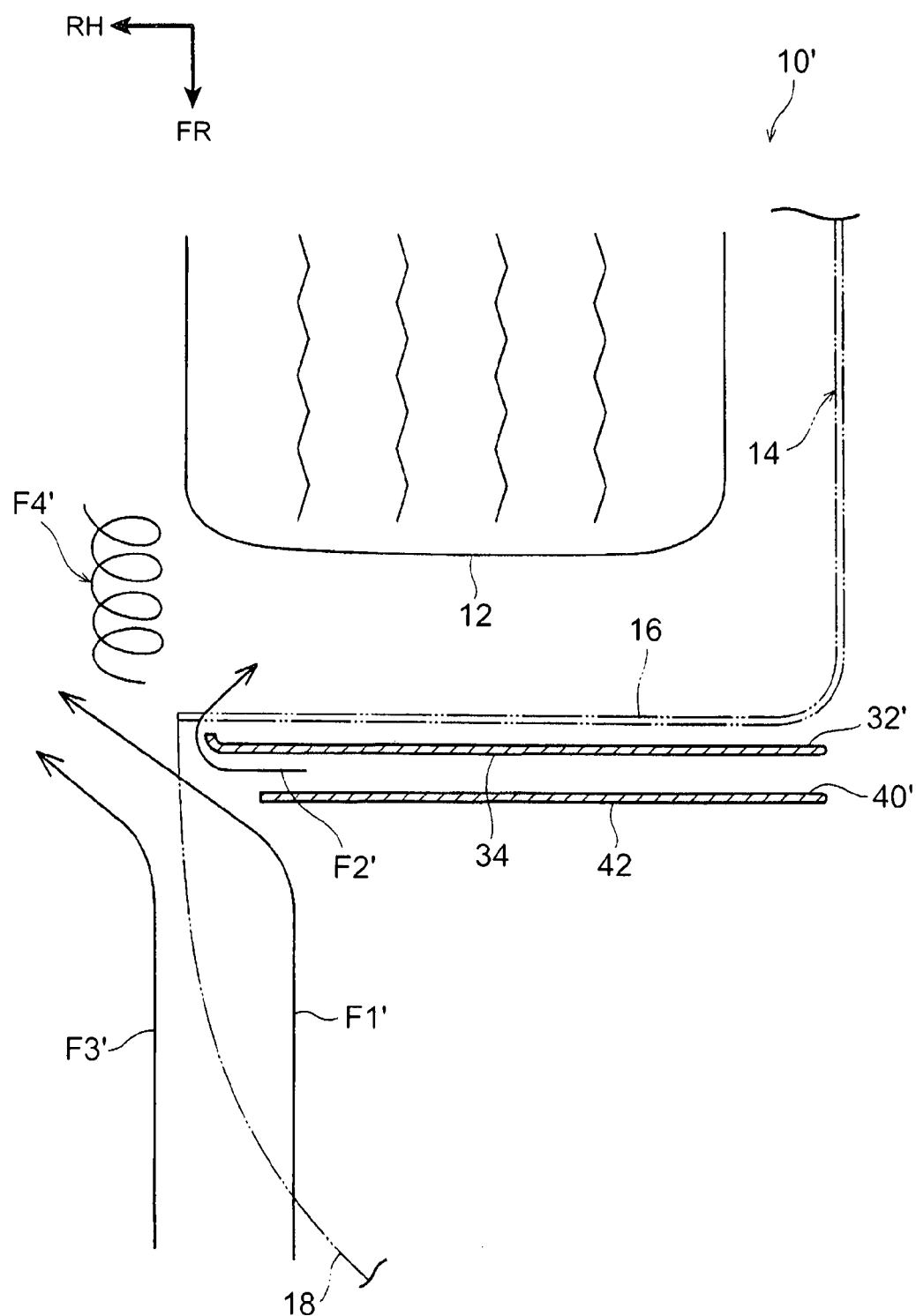
FIG. 12 is a planar cross-sectional view showing a multiple spat in a comparative example and corresponding to FIG. 2, as viewed from above the vehicle.

As shown in FIG. 12, the vehicle 10' according to the comparative example is configured in the same manner as the vehicle 10 according to the first embodiment of the invention, except in the following respects. That is, in the vehicle 10' according to the comparative example, the guide portion 44 according to the first embodiment of the invention is omitted in a front spat body portion 40'. Furthermore, a vehicle-width-direction outer end of the front spat body portion 40' is arranged more inward in the vehicle width direction than a vehicle-width-direction outer end of a rear spat body portion 32'. Besides, the inclined portion 36 according to the first embodiment of the invention is omitted in the rear spat body portion 32'. Furthermore, the rear spat body portion 32' extends substantially rectilinearly in the vehicle width direction. Incidentally, those components which are configured in the same manner as in the vehicle 10 according to this embodiment of the invention are denoted by the same reference symbols respectively.

Then, if the vehicle 10' according to the comparative example travels and a traveling wind F1' that travels toward the vehicle rear side hits the vehicle-width-direction outer end of the front spat body portion 40', the traveling wind F1' flows in such a manner as to be blown out outward in the vehicle width direction, because the guide portion 44 is omitted in the front spat body portion 40'. Then, this blown-out traveling wind F1' collides with a traveling wind F3' that flows toward the vehicle rear side beside the vehicle 10', and the traveling wind F3' is pushed out outward in the vehicle width direction. Thus, air turbulence occurs (see F4' of FIG. 12) beside the vehicle 10', so that the air resistance of the vehicle 10' becomes high.

On the other hand, if a traveling wind F2' that has hit the rear spat body portion 32' flows outward of the rear spat body portion 32' in the vehicle width direction, the traveling wind F2' flows toward the vehicle rear side of the rear spat body portion 32' in such a manner as to engulf the vehicle-width-direction outer end of the rear spat body portion 32'. Thus, if the traveling wind F2' engulfed by the vehicle rear side of the rear spat body portion 32' hits the front tire 12, the air resistance of the vehicle 10' becomes high.

Figure 2:
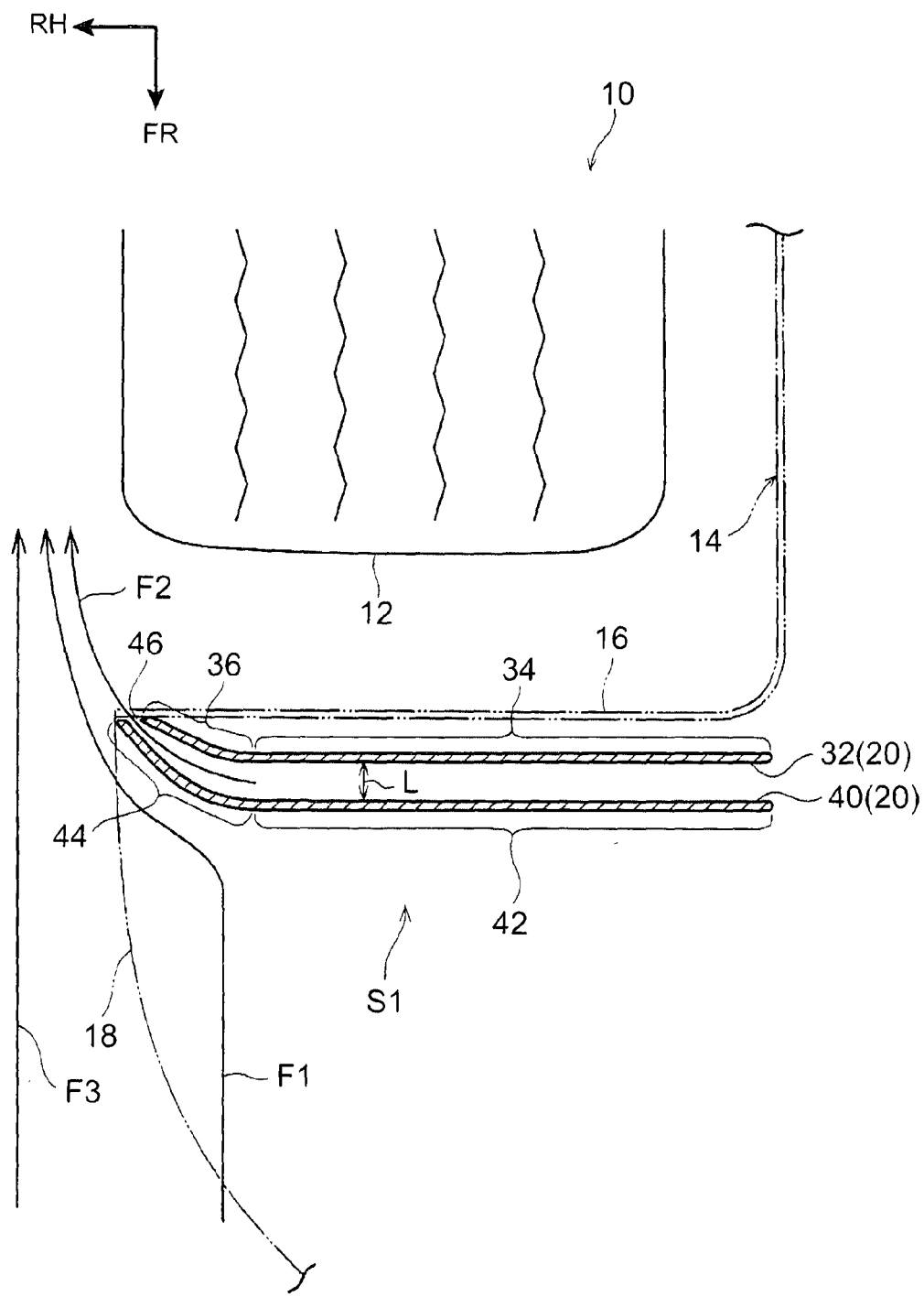
FIG. 2 is a planar cross-sectional view showing a multiple spat shown in FIG. 1, as viewed from above the vehicle (a cross-sectional view taken along a line II-II of FIG. 1)
Figure 3:
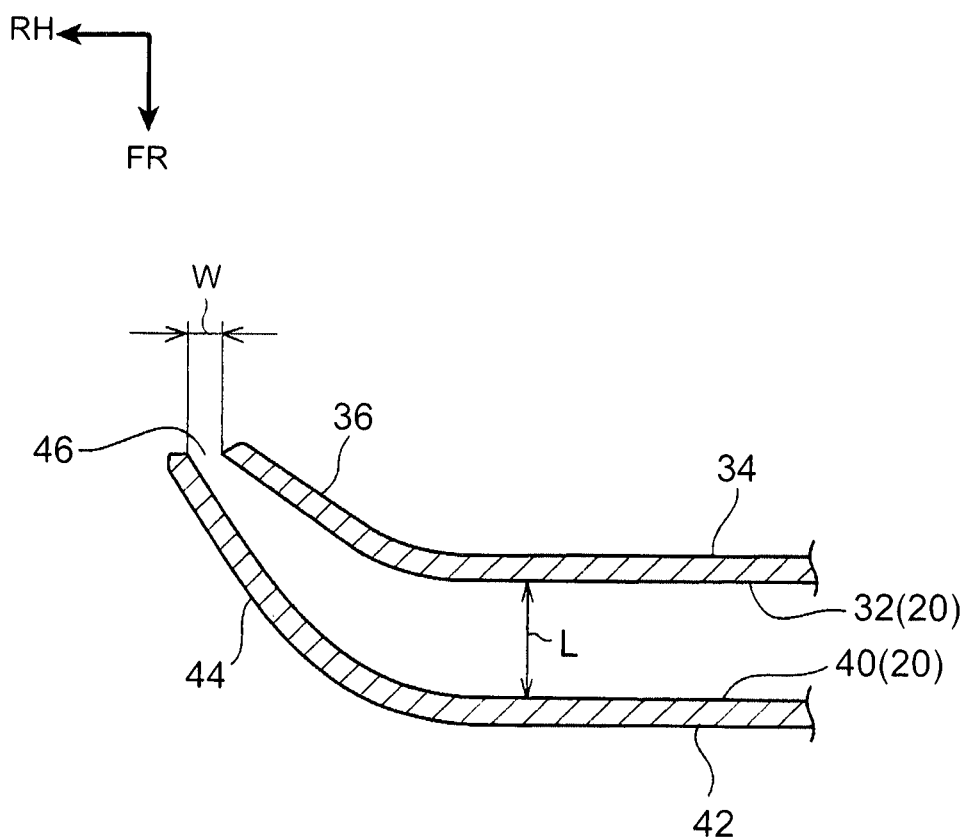
FIG. 3 is an enlarged planar cross-sectional view showing a vehicle-width-direction outer region of the multiple spat shown in FIG. 2.
Figure 4:
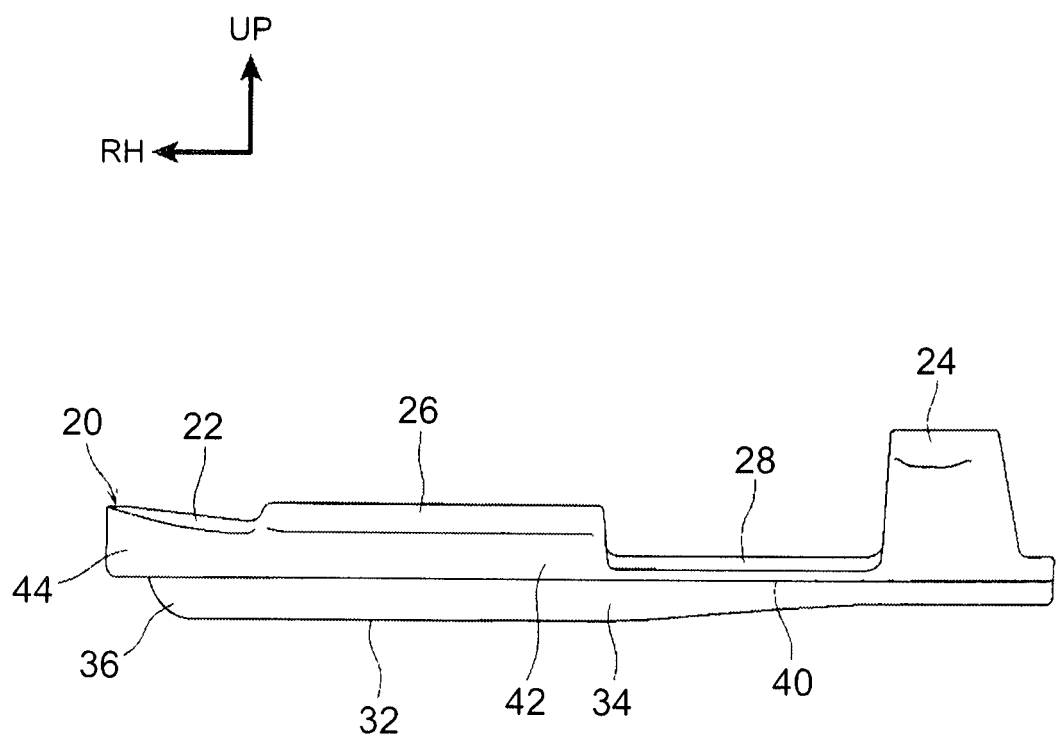
FIG. 4 is a front view showing the multiple spat shown in FIG. 1, as viewed from a side in front of the vehicle.
Figure 5:
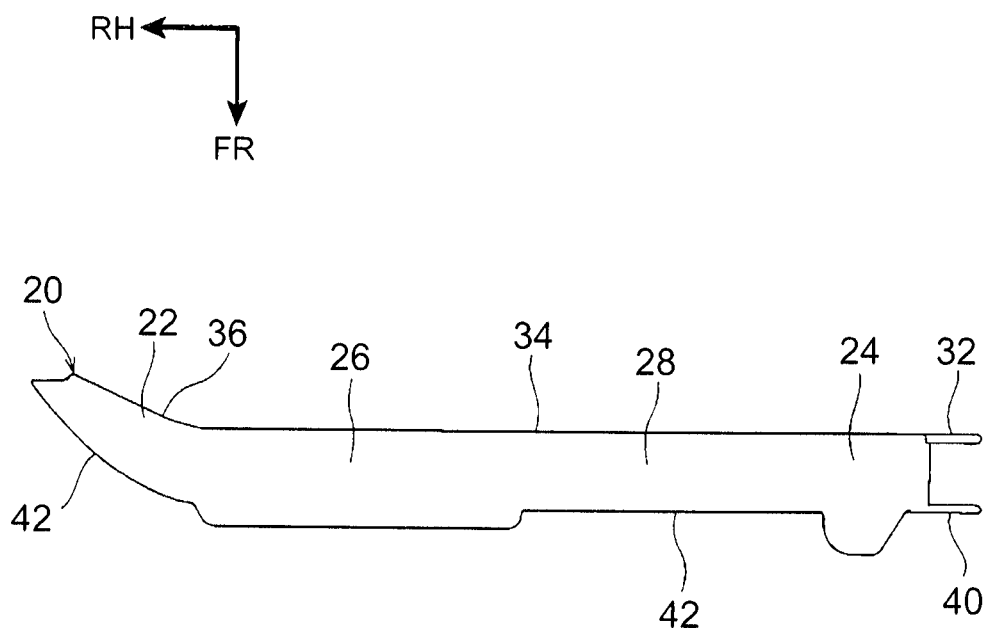
FIG. 5 is a plan view showing the multiple spat shown in FIG. 4, as viewed from above the vehicle.
Figure 6:
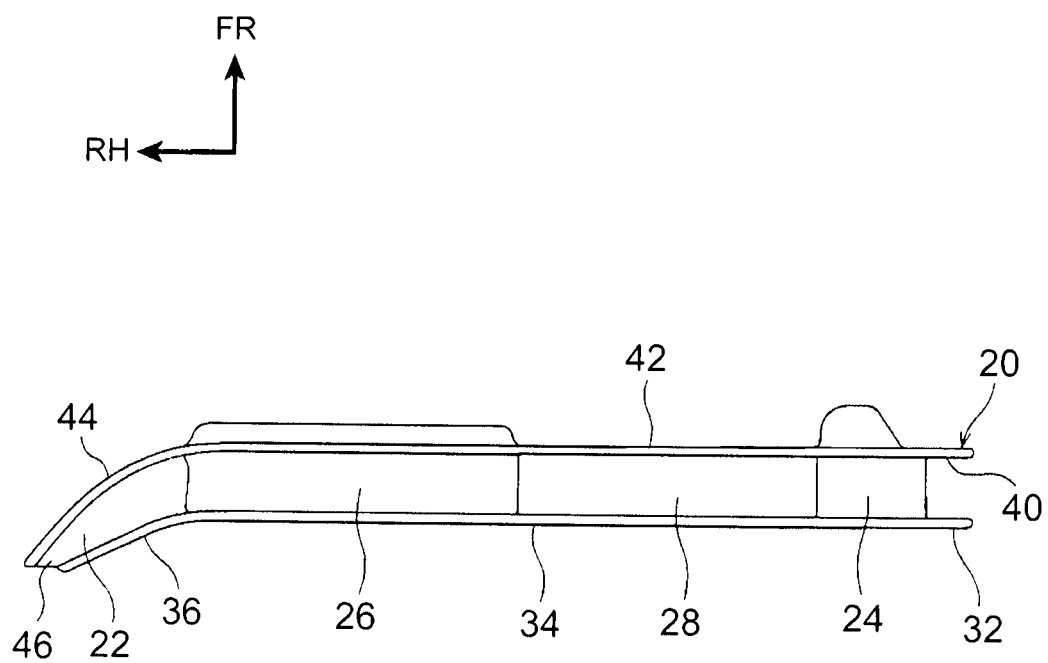
FIG. 6 is a bottom view showing the multiple spat shown in FIG. 4, as viewed from below the vehicle.
Figure 7:
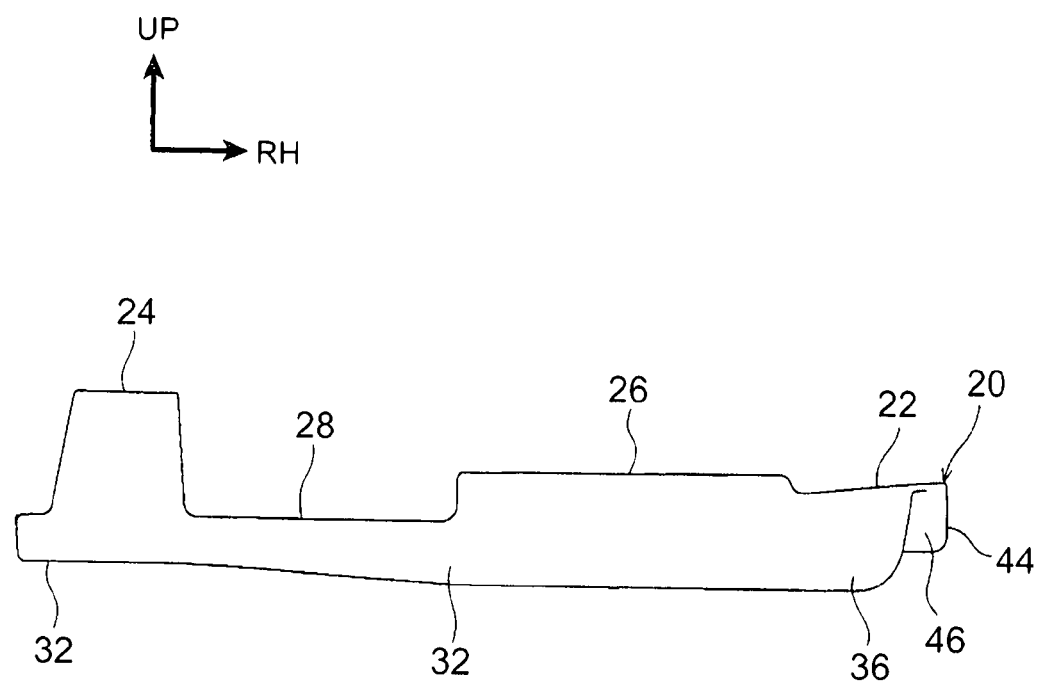
FIG. 7 is a back view showing the multiple spat shown in FIG. 4, as viewed from behind the vehicle.
Figure 8:
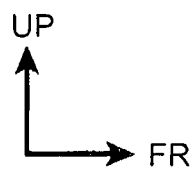
FIG. 8 is a lateral view showing the multiple spat shown in FIG. 4, as viewed from a right side of the vehicle.
Figure 8:
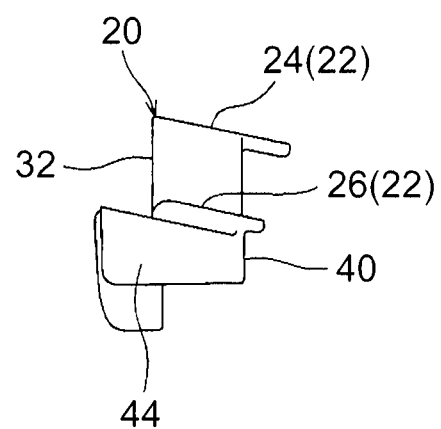
Figure 9:
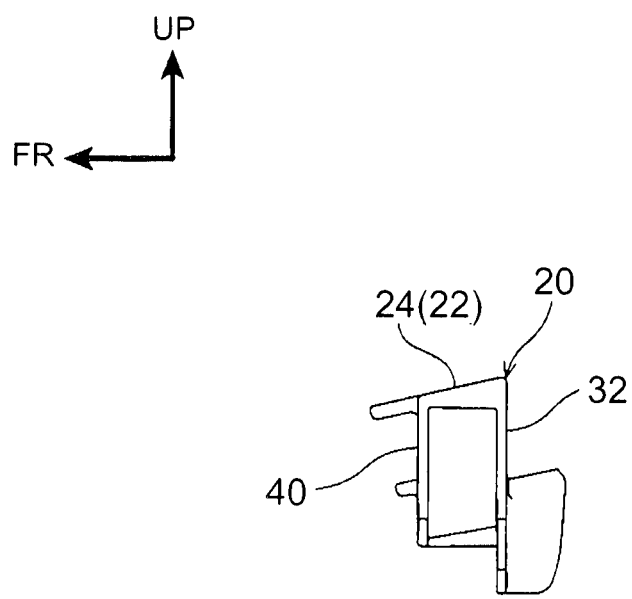
FIG. 9 is a lateral view showing the multiple spat shown in FIG. 4, as viewed from a left side of the vehicle.
Figure 10:
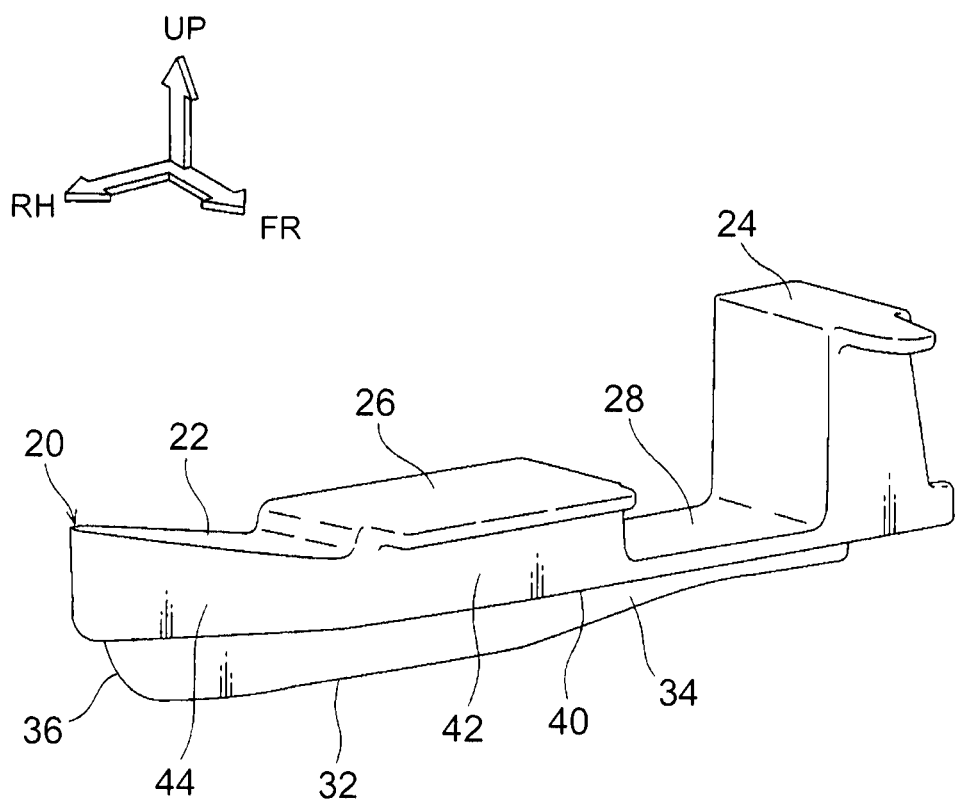
FIG. 10 is a perspective view showing the multiple spat shown in FIG. 4, as viewed from the area diagonally to the right of and in front of the vehicle.
Figure 11:
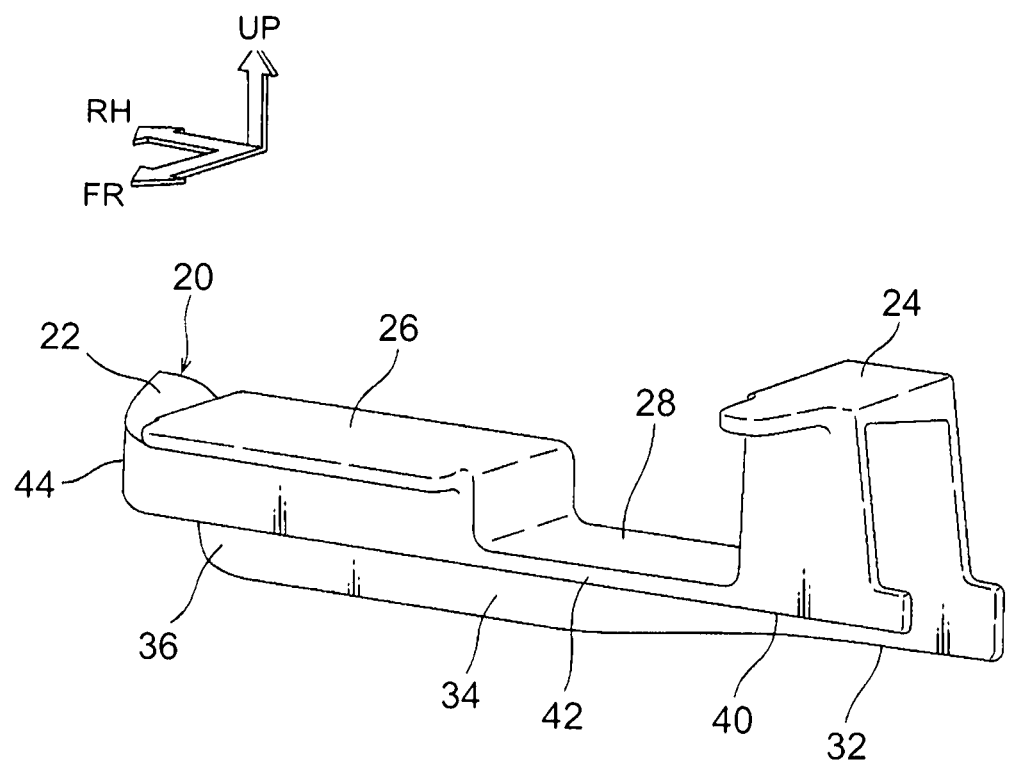
FIG. 11 is a perspective view showing the multiple spat shown in FIG. 4, as viewed from an area diagonally to the left of and in front of the vehicle.

In contrast, as shown in FIG. 2, in the vehicle 10 to which the vehicle lower structure S1 according to the first embodiment of the invention is applied, the vehicle-width-direction outer region of the front spat body portion 40 serves as the guide portion 44. The guide portion 44 is inclined toward the vehicle rear side and outward in the vehicle width direction. Thus, if the traveling wind F1 hits the guide portion 44 of the front spat body portion 40, the traveling wind F1 is guided (flow-straightened) by the guide portion 44, and flows toward the vehicle rear side along the guide portion 44. Then, this traveling wind F1 is blown out toward the vehicle rear side from the vehicle-width-direction outer end of the guide portion 44. Thus, the traveling wind F1 that has been blown out from the vehicle-width-direction outer end of the guide portion 44 and the traveling wind F3 that flows toward the vehicle rear side beside the vehicle 10 are restrained from hitting each other. Thus, the occurrence of air turbulence beside the vehicle 10 can be suppressed.

Besides, in the first embodiment of the invention, the vehicle-width-direction outer end of the guide portion 44 is arranged more outward in the vehicle width direction than the vehicle-width-direction outer end of the rear spat body portion 32. Thus, if the traveling wind F2 that has hit the rear spat body portion 32 flows outward in the vehicle width direction along the rear spat body portion 32, the traveling wind F2 hits a rear face of the guide portion 44, and is guided (flow-straightened) by the rear face of the guide portion 44. Then, the traveling wind F2 flows toward the vehicle rear side along the rear face of the guide portion 44, and is blown out toward the vehicle rear side from the discharge portion 46. Moreover, in this case, the traveling wind F2 that is blown out from the discharge portion 46 is pulled in by the traveling wind F1 that is blown out toward the vehicle rear side from a front face of the guide portion 44, and is blown out toward the vehicle rear side together with the traveling wind F1. Thus, the traveling wind F2 that has hit the rear spat body portion 32 is restrained from flowing toward the vehicle rear side of the rear spat body portion 32 in such a manner as to engulf the vehicle-width-direction outer end of the rear spat body portion 32. As a result, the traveling wind F2 and the front tire 12 can be restrained from hitting each other. Owing to the foregoing, the aerodynamic performance of the vehicle 10 in the case where the plurality of the spat body portions (the rear spat body portion 32 and the front spat body portion 40) are provided can be enhanced.

Besides, the width dimension W of the discharge portion 46 is set shorter than the spacing distance L. That is, the gap between the rear spat body portion 32 and the front spat body portion 40 is set narrowest at the discharge portion 46. Thus, according to the Bernoulli's theory, the velocity of the traveling wind F2 that is blown out toward the vehicle rear side from the discharge portion 46 increases. Thus, the traveling wind F2 is further restrained from flowing toward the vehicle rear side of the rear spat body portion 32 in such a manner as to engulf the vehicle-width-direction outer end of the rear spat body portion 32. Accordingly, the traveling wind F2 and the front tire 12 can be effectively restrained from hitting each other.

Figure 13A:
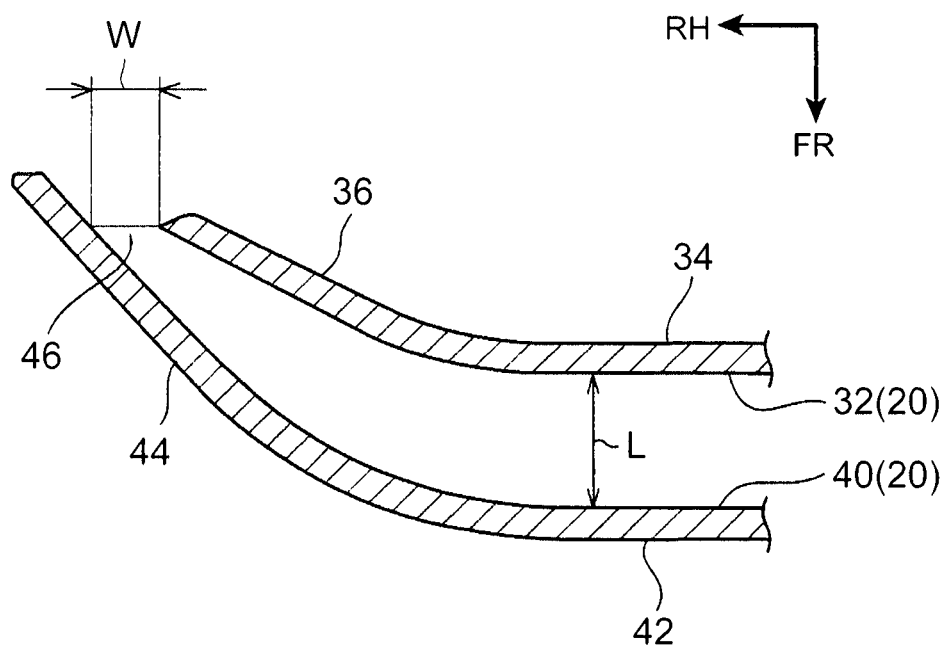
FIG. 13A is an enlarged planar cross-sectional view showing a modification example of the vehicle-width-direction outer region of the multiple spat shown in FIG. 2.
Figure 13B:
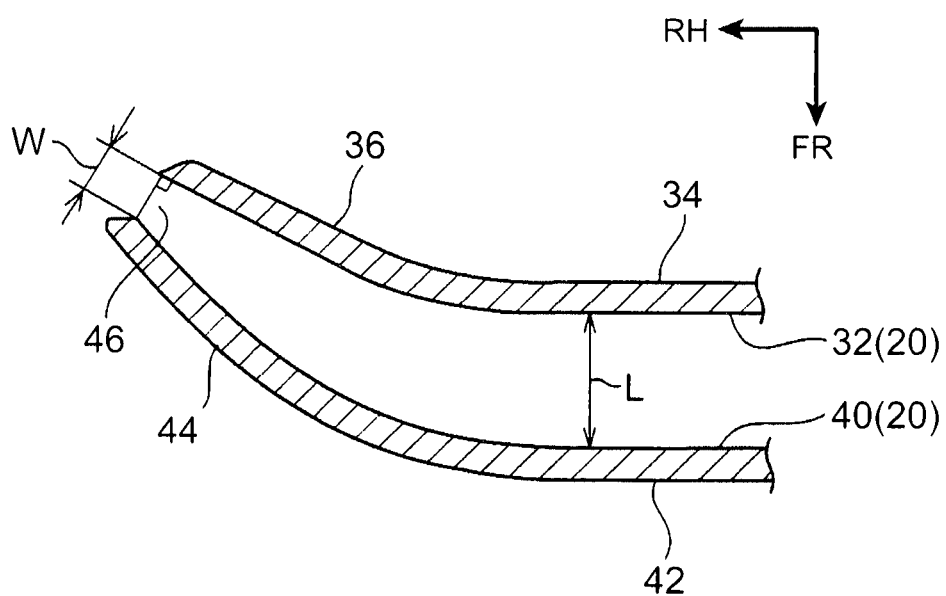
FIG. 13B is an enlarged planar cross-sectional view showing another modification example of the vehicle-width-direction outer region of the multiple spat shown in FIG. 2.

Incidentally, in the first embodiment of the invention, in the vehicle longitudinal direction, the vehicle-width-direction outer end of the guide portion 44 is set to a position that substantially coincides with the vehicle-width-direction outer end of the rear spat body portion 32. Instead, as shown in FIG. 13A, the vehicle-width-direction outer end of the guide portion 44 may be set closer to the vehicle rear side than the vehicle-width-direction outer end of the rear spat body portion 32. Besides, as shown in FIG. 13B, the vehicle-width-direction outer end of the guide portion 44 may be set closer to the vehicle front side than the vehicle-width-direction outer end of the rear spat body portion 32. In particular, the length of the guide portion 44 can be set long in the case where the vehicle-width-direction outer end of the guide portion 44 is set closer to the vehicle rear end than the vehicle-width-direction outer end of the rear spat body portion 32. That is, the region that guides (flow-straightens) the traveling winds F1 and F2 that have hit the front spat body portion 40 and the rear spat body portion 32 can be set long. Accordingly, the flow-straightening effect of the guide portion 44 for the traveling winds F1 and F2 can be enhanced.

In addition, the width dimension W of the discharge portion 46 in the case where the vehicle-width-direction outer end of the guide portion 44 is set closer to the vehicle rear side than the vehicle-width-direction outer end of the rear spat body portion 32 means a distance between the vehicle-width-direction outer end of the rear spat body portion 32 and the guide portion 44 in the vehicle width direction (see an arrow W shown in FIG. 13A). Besides, the width dimension W in the case where the position of the vehicle-width-direction outer end of the guide portion 44 inset closer to the vehicle front side than the position of the vehicle-width-direction outer end of the rear spat body portion 32 means a distance between the rear spat body portion 32 and the front spat body portion 40 on a line that starts from the vehicle-width-direction outer end of the front spat body portion 40 and is perpendicular to the rear spat body portion 32 (see an arrow W shown in FIG. 13B).

Second Embodiment

Figure 14:
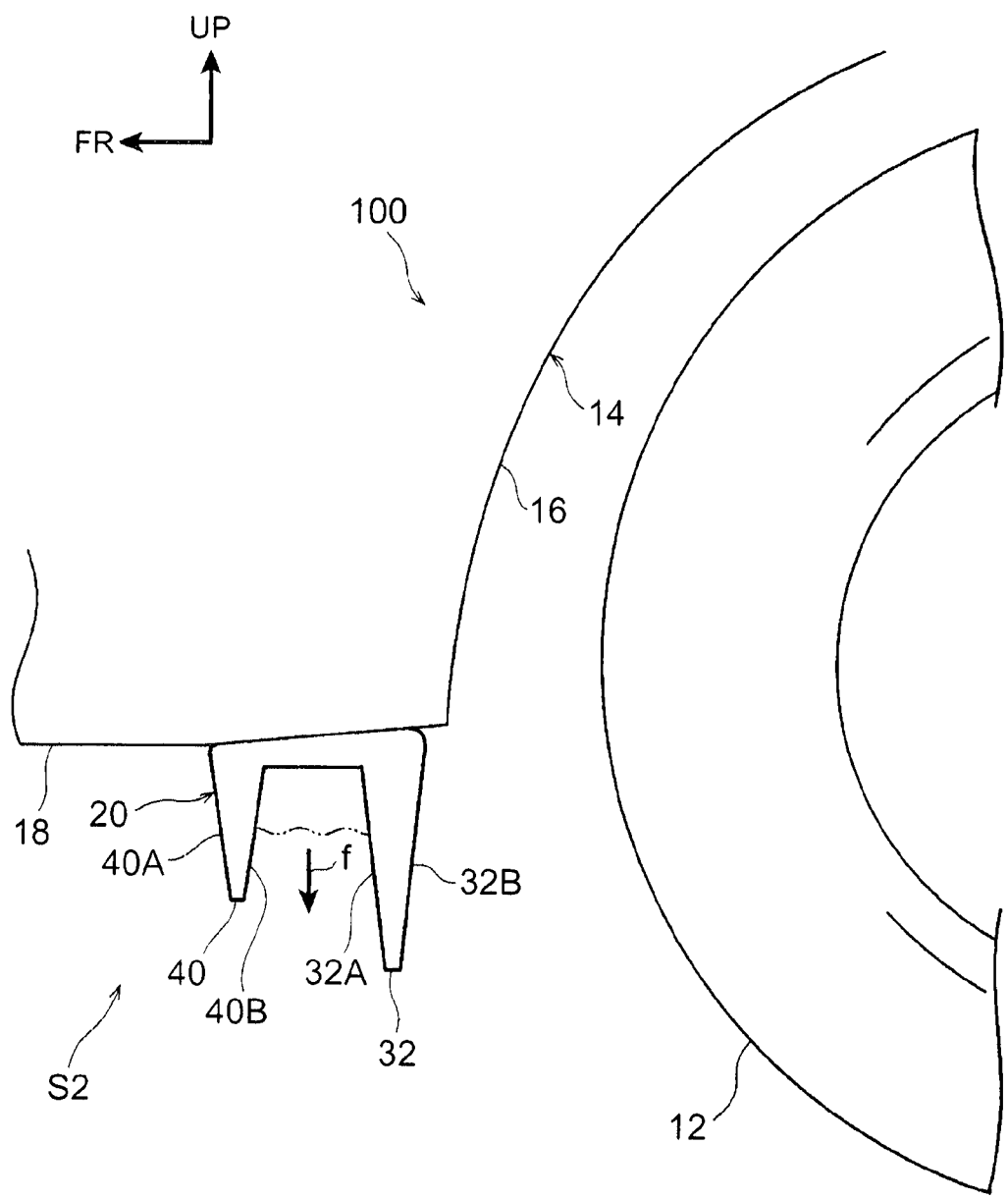
FIG. 14 is a schematic lateral view showing a multiple spat used for a vehicle to which a vehicle lower structure according to the second embodiment of the invention is applied, as viewed from inside in the vehicle width direction.

In FIG. 14, the multiple spat 20 that is used in a vehicle 100 to which a vehicle lower structure S2 according to the second embodiment of the invention is applied is shown as a schematic lateral view as viewed from inside in the vehicle width direction. In addition, the second embodiment of the invention is configured in the same manner as the first embodiment of the invention except in the shapes of the rear spat body portion 32 and the front spat body portion 40 in the multiple spat 20 described below.

That is, in the second embodiment of the invention, a front face 32A of the rear spat body portion 32 (a front face of the general portion 34 and a front face of the inclined portion 36) and a rear face 32B of the rear spat body portion 32 (a rear face of the general portion 34 and a rear face of the inclined portion 36) are arranged inclined in such a direction as to approach each other with decrease in distance to the vehicle lower side in a lateral view. In other words, the board thickness dimension of the rear spat body portion 32 is set in such a manner as to decrease with decrease in distance to the vehicle lower side.

Besides, as is the case with the rear spat body portion 32, a front face 40A of the front spat body portion 40 (a front face of the general portion 42 and a front face of the guide portion 44) and a rear face 40B of the front spat body portion 40 (a rear face of the general portion 42 and a rear face of the guide portion 44) are arranged inclined in such a direction as to approach each other with decrease in distance to the vehicle lower side in a lateral view. That is, the front face 32A of the rear spat body portion 32 and the rear face 40B of the front spat body portion 40 are inclined in such a direction as to move away from each other with decrease in distance to the vehicle lower side. In other words, the front face 32A of the rear spat body portion 32 is inclined in such a direction as to move away from the opposed front spat body portion 40 with decrease in distance to the vehicle lower side. Besides, the rear face 40B of the front spat body portion 40 is inclined in such a direction as to move away from the opposed rear spat body portion 32 with decrease in distance to the vehicle lower side. Thus, the second embodiment of the invention can also achieve an operation and effect similar to those of the first embodiment of the invention.

Besides, in the second embodiment of the invention, the front face 32A of the rear spat body portion 32 and the rear face 40B of the front spat body portion 40 are inclined in such a direction as to move away from each other with decrease in distance to the vehicle lower side. Thus, the accretion of ice, snow or the like between the rear spat body portion 32 and the front spat body portion 40 can be suppressed. This point will be described hereinafter.

For example, if water, snow or the like is splashed up between the rear spat body portion 32 and the front spat body portion 40 during traveling of the vehicle 100, the accretion of ice, snow or the like occurs between the rear spat body portion 32 and the front spat body portion 40 due to this water, this snow or the like (see an alternate long and two short dashes line of FIG. 14). Then, in response to a force f causing the ice, snow or the like accreted between the rear spat body portion 32 and the front spat body portion 40 to fall, a frictional force is generated between the rear spat body portion 32 and the front spat body portion 40 on the one hand and the accreted ice, snow or the like on the other hand.

It should be noted herein that if the front face 32A of the rear spat body portion 32 and the rear face 40B of the front spat body portion 40 are arranged parallel to each other in a vertical direction with respect to the vehicle in a lateral view, the accreted ice, snow or the like is unlikely to fall from between the rear spat body portion 32 and the front spat body portion 40 due to the aforementioned frictional force.

In contrast, according to the second embodiment of the invention, the front face 32A of the rear spat body portion 32 and the rear face 40B of the front spat body portion 40 are inclined in such a direction as to move away from each other with decrease in distance to the vehicle lower side. Thus, the frictional force between the rear spat body portion 32 and the front spat body portion 40 on the one hand and the accreted ice, snow or the like on the other hand becomes small. Thus, the accreted ice, snow or the like is likely to fall from between the rear spat body portion 32 and the front spat body portion 40. Accordingly, the accretion of ice, snow or the like between the rear spat body portion 32 and the front spat body portion 40 can be suppressed.

Besides, in the second embodiment of the invention, the front face 40A of the front spat body portion 40 is inclined toward the vehicle rear side with decrease in distance to the vehicle lower side. Thus, the water, snow or the like splashed up during traveling of the vehicle 100 can be restrained from staying on the front face 40A of the front spat body portion 40.

Incidentally, in the second embodiment of the invention, the front face 32A and rear face 32B of the rear spat body portion 32 are inclined in such a direction as to approach each other with decrease in distance to the vehicle lower side. Besides, the front face 40A and rear face 40B of the front spat body portion 40 are inclined in such a direction as to approach each other with decrease in distance to the vehicle lower side. Instead, at least one of the front face 32A of the rear spat body portion 32 and the rear face 40B of the front spat body portion 40 may be inclined in such a direction as to move away from the opposed spat body portion with decrease in distance to the vehicle lower side. In this case as well, the frictional force between the rear spat body portion 32 and the front spat body portion 40 on the one hand and the accreted ice, snow or the like on the other hand becomes small. Thus, the accreted ice, snow or the like is likely to fall from between the rear spat body portion 32 and the front spat body portion 40. Besides, in this case, the rear face 32B of the rear spat body portion 32 and the front face 40A of the front spat body portion 40 may be arranged parallel to each other in the vertical direction with respect to the vehicle, in a lateral view.

Besides, in the second embodiment of the invention, the board thickness dimensions of the rear spat body portion 32 and the front spat body portion 40 are set in such a manner as to decrease with decrease in distance to the vehicle lower side. Thus, the front face 32A of the rear spat body portion 32 and the rear face 40B of the front spat body portion 40 are inclined in such a direction as to move away from each other with decrease in distance to the vehicle lower side. Instead, the board thickness dimensions of the rear spat body portion 32 and the front spat body portion 40 may be set constant, and at least one of the rear spat body portion 32 and the front spat body portion 40 may be inclined in such a direction as to move away from the opposed spat body portion with decrease in distance to the vehicle lower side.

In each of the first and second embodiments of the invention, the multiple spat 20 is configured to include the spat body portions at two spots (the rear spat body portion 32 and the front spat body portion 40). Furthermore, the multiple spat 20 may be constituted of spat body portions at three or more spots. For example, in the case where the multiple spat 20 is constituted of the spat body portions at the three spots, the third spat body portion is formed on the vehicle front side of the front spat body portion 40. The third spat body portion is configured to include a general portion and a guide portion, as is the case with the front spat body portion 40. In addition, the positional relationship or the like between the third spat body portion and the front spat body portion 40 is configured in the same manner as the positional relationship or the like between the front spat body portion 40 and the rear spat body portion 32.

Besides, in each of the first and second embodiments of the invention, the multiple spat 20 is fixed to the fender liner 14 that constitutes the underfloor 18. However, the member for fixing the multiple spat 20 is not thus limited. For example, the multiple spat 20 may be fixed to an undercover, bumper cover or the like that is arranged on the vehicle front side of the front tire 12. Furthermore, for example, the multiple spat 20 may be formed integrally with the fender liner 14 and the bumper cover.

Furthermore, the rear spat body portion 32 is configured to include the general portion 34 and the inclined portion 36. The inclined portion 36 may be omitted in the rear spat body portion 32, and the general portion 34 may be extended outward in the vehicle width direction.

Furthermore, in each of the first and second embodiments of the invention, the multiple spat 20 is provided on the vehicle front side of the front tire 12 of the vehicle 10. The multiple spat 20 may be provided on the vehicle front side of a rear tire of a rear portion of the vehicle 10.

What is claimed is:

1. A vehicle lower structure comprising:
a plurality of spat body portions that are provided side by side in a vehicle longitudinal direction on a vehicle front side of a wheel, are protruded from an underfloor of the vehicle toward a vehicle lower side, and extend in a vehicle width direction; and a guide portion that constitutes vehicle-width-direction outer regions of the spat body portions in at least one of second and subsequent rows from a vehicle rear side, is inclined toward the vehicle rear side and outward in the vehicle width direction to guide a traveling wind, and has a vehicle-width-direction outer end that is arranged more outward in the vehicle width direction than a vehicle-width-direction outer end of the spat body portion that is adjacent to the vehicle rear side.

2. The vehicle lower structure according to claim 1, wherein
a spacing distance between vehicle-width-direction outer ends of a pair of the spat body portions that are adjacent to each other in the vehicle longitudinal direction is set shorter than a spacing distance between the pair of the spat body portions in the vehicle longitudinal direction.

3. The vehicle lower structure according to claim 1, wherein
at least one of opposed faces of a pair of the spat body portions that are adjacent to each other in the vehicle longitudinal direction is inclined in such a direction as to move away from the opposed spat body portion with decrease in distance to the vehicle lower side.

4. The vehicle lower structure according to claim 3, wherein
a spacing distance between vehicle-width-direction outer ends of the pair of the spat body portions that are adjacent to each other in the vehicle longitudinal direction is set shorter than a spacing distance between the pair of the spat body portions in the vehicle.

5. The vehicle lower structure according to claim 1, wherein
the vehicle-width-direction outer end of the guide portion is arranged closer to the vehicle rear side than the vehicle-width-direction outer end of the spat body portion that is adjacent to the vehicle rear side.

\* \* \* \* \*